US006725303B1

United States Patent
Hoguta et al.

(12) 
(10) Patent No.: US 6,725,303 B1
(45) Date of Patent: Apr. 20, 2004

(54) METHOD AND APPARATUS FOR ESTABLISHING A PERSONALIZED CONNECTION WITH A NETWORK

(75) Inventors: Kenneth J. Hoguta, Thornton, CO (US); Amy J. Rupert, Red Bank, NJ (US); Jesse Eugene Russell, Piscataway, NJ (US); Ronald Sherman, Livingston, NJ (US)

(73) Assignee: AT&T Corp., New York, NY (US)

( * ) Notice: Subject to any disclaimer, the term of this patent is extended or adjusted under 35 U.S.C. 154(b) by 450 days.

(21) Appl. No.: 09/651,852

(22) Filed: Aug. 31, 2000

(51) Int. Cl.⁷ .......................... G06F 13/42; G06F 15/16
(52) U.S. Cl. .................. 710/106; 709/227; 709/228
(58) Field of Search ................ 348/7; 710/305, 710/106, 65; 709/227, 228, 220, 221

(56) References Cited

U.S. PATENT DOCUMENTS

| 5,319,705 A |   | 6/1994  | Halter et al. |
|---|---|---|---|
| 5,384,770 A | * | 1/1995  | Mays et al. .................... 370/43 |
| 5,475,816 A | * | 12/1995 | Yonezawa et al. .......... 709/224 |
| 5,640,193 A | * | 6/1997  | Wellner .......................... 348/7 |
| 5,793,368 A |   | 8/1998  | Beer |
| 6,459,427 B1 | * | 10/2002 | Mao et al. .................. 345/327 |
| 6,578,075 B1 | * | 6/2003  | Nieminen et al. ........... 709/221 |

FOREIGN PATENT DOCUMENTS

| EP | 0697793 A3 | 2/1996 |
|---|---|---|
| EP | 0791881 A | 2/1997 |
| EP | 0791881 A1 | 2/1997 |
| EP | 0794648 A2 | 9/1997 |
| JP | 10-123524 | 5/1998 |
| WO | WO 98/00951 A2 | 1/1998 |
| WO | WO9800951 A | 1/1998 |
| WO | WO9921336 A | 4/1999 |
| WO | WO 99/21336 A1 | 4/1999 |

OTHER PUBLICATIONS

EPO Search Report Dated Aug. 9, 2002 regarding European Patent Application No. 01305913.4.
European Search Report dated Aug. 9, 2002 regarding European Patent Application No. EP 01 30 5913.
"Optimizing Queries Over Multimedia Repositories" by Chaudhuri et al., *SIGMOD Record* (ACM Special Interest Group on Management of Data) v. 25, n 2 Jun. 1996, pp. 91–102, 1996.
"A Proposal on Content Information Management for Multimedia Service Navigation System" by Tate, et al., *IEEE Symposium Record on Network Operations and Management Symposium*, v. 2, 1996, IEEE, Piscataway, NJ USA 96CB37575, pp. 466–475.
"Smart Card's Advantage: Mobility, Security, Flexibility" by K. Hodgson, *Security (USA)*, vol. 32, No. 3, Mar. 1995, pp. 22–24.
"An Approach Towards the Implementation of a Knowledge–Based Selector of Communication Services for Multimedia Applications" by Pronios, et al., *AI '94, Fourteenth International Avignon Conference Proceedings*, vol. 1, 1994, pp. 399–408.

* cited by examiner

*Primary Examiner*—Tim Vo

(57) ABSTRACT

A method and apparatus for establishing a personalized connection with a network from a variety of different terminals and/or ports connected with the network. Subscribers to the network can be provided with a unique subscriber ID that may be used by the network to identify the subscriber. Furthermore, based on the subscriber ID, the network or a network customizing device can access a subscriber profile in order to personalize a connection with the subscriber. Additionally, the subscriber profile can be used by the network service provider for billing purposes.

31 Claims, 3 Drawing Sheets

FIG. 3

| SUBSCRIBER ID | TERMINAL TYPES. TRANSACTIONS/SESSION TYPES | BILLING, CREDIT CARD/E-WALLET | SUBSCRIBER PREFERENCES OR ENTITILEMENTS/LOCATION POINTER | INTERFACES OR FUNCTIONALITY ATTRIBUTES | DESCRIPTION OF SERVICE AND QUALITY OF SERVICE ATTRIBUTES |
|---|---|---|---|---|---|
| 302 | 304 | 306 | 308 | 310 | 312 |
| SUBSCRIBER 1 | TELEVISION | ADDRESS 1 | TV PREF./ENTITLE | ATM, VIDEOPHONE, INTERNET | VIDEO: HIGH AUDIO: MEDIUM DATA: MEDIUM |
| | TELEPHONE | ADDRESS 2 | TELE. PREF./ENTITLE | | |
| | RADIO | CREDIT 1 | RADIO PREF./ENTITLE | | |
| | | | URL PREF./ENTITLE | | |
| SUBSCRIBER 2 | TELEVISION | ADDRESS 3 | TV PREF. | ELECTRONIC COMMERCE, WEB BROWSER | VIDEO: MEDIUM AUDIO: MEDIUM DATA: LOW |
| | TELEPHONE | | TELE. PREF. | | |
| | WEB BROWSER | | WEB PREF. | | |
| | VIDEO PHONE | | VIDEO PHONE PREF. | | |
| | RADIO | | RADIO PREF. | | |
| | | | COPYING RIGHTS | | |
| | | | INTERNET AND PROGRAM GUIDE PREFS./ENTITLE | | |

300

METHOD AND APPARATUS FOR ESTABLISHING A PERSONALIZED CONNECTION WITH A NETWORK

BACKGROUND OF THE INVENTION

1. Field of Invention

The invention relates to a method and apparatus for providing personalized connections with a communication network.

2. Description of Related Art

Presently, subscribers to a communications network service can establish a connection between their terminals and the network via a network access link. The network access link can be a wired (multiple twisted pair cable, coaxial cable, optical fiber cable) or wireless (radio frequency, optical wavelength) link to the network. Because of recent improvements in the speed and availability of network access links between the network and the subscriber's terminal, such as gigabit Ethernet, DSL, cable modems, digital cable modulation, radio, over-the-air optical links, and direct broadcast satellite transmission, digital terrestrial broadcast TV, many new types of terminals have been developed to take advantage of these high speed links. For example, subscriber terminal devices, such as WebTV™ set-top boxes, digital set-top audio/video decoders, hard disk-based personal digital video recorders, screen equipped web phones, voice and video telephone sets, streaming audio and video media players, integrated intelligent digital television receivers, thin-client network computers, PCS wireless Internet phones, mobile satellite receivers, or GPS navigator terminals can permit a subscriber to access and communicate over the network and utilize the high speed access links.

As the number and availability of terminal types used by subscribers increases, and the number and types of voice, video and data information communications and entertainment service offerings increases, so too will a need for the subscriber to become more knowledgeable as to the use of each of these new terminals and services. Furthermore, subscribers are becoming more mobile and switching between terminals at different locations, such as home Internet, digital television or video telephone terminals and hotel Internet, digital television, or video telephone terminals, and/or a mobile wireless Internet PCS phone terminal, or mobile satellite Internet receiver. The mobile subscribers will need to be able to customize terminal configuration, network connection, and service choices as to their preference and what they are willing to purchase, without having to proceed through an elaborate customization process at each use location, whether fixed or mobile.

Accordingly, there exists a need for providing a subscriber with a method of uniformly customizing the use of varied terminals and services in accordance with a subscriber's preferences and purchased entitlements. Additionally, such a method also supports the ability of a network operator/service provider to offer either separate or integrated billing for multiple services and to control the authorization of entitlements commensurate with an amount that the subscriber has purchased.

SUMMARY OF THE INVENTION

The present invention provides methods and apparatus for establishing a personalized connection with a communications network and access to varied levels of network capabilities and services from a variety of different terminals and/or ports connected with the network. The network to which the present invention pertains includes both wired and wireless networks regardless of physical medium, including, but not limited to, multiple twisted pair cable, coaxial cable, optical fiber, radio, over-the-air optical wavelength, terrestrial broadcast radio or television, satellite transmission, or a combination thereof.

The variety of different terminals to which the present invention pertains is any terminal device which allows a subscriber to connect to and use a network's capacity, features and services, and access (and copy) information or program content available through the network. Such terminals include, but are not limited to, Internet over TV set-top boxes, digital set-top audio/video decoders, personal digital video recorders, screen equipped web phones, voice and video telephone sets, streaming audio and video media players, integrated intelligent digital television receivers, personal computers, thin-client network computers, PCS wireless Internet phones, mobile satellite receivers, GPS receivers, or automated teller machines.

Subscribers to network services can be provided with a unique subscriber ID. Based on the subscriber ID together with any other personal information input by the subscriber at the subscriber terminal, a network or network customizing device can access a subscriber profile that includes the subscriber's preferences in order to personalize the network connection. The subscriber profile can also be used to authorize any service entitlements which the subscriber has purchased and will be billed for.

The types of information contained in the subscriber profile include, but are not limited to, subscriber preferences and service entitlements related to long distance, local or wireless phone calling plans (e.g., rates and peak/off-peak hours, calling circles), communication link attributes (e.g., speed, guaranteed information rate), television programming (e.g., premium encrypted or basic unencrypted programs, programming genres, program time-shifting), information resources, the type of network the user wishes to use, communication protocols corresponding to particular networks, multimedia content access (e.g., Internet or intranet site access, software downloads) and any rights to copy such content. The subscriber's profile information can either contain the types of aforementioned information directly or it can contain locator information pointing to one or more storage locations throughout the network where the types of aforementioned information can be found.

The subscriber profile can also store the subscriber's preferences and entitlements in a manner that is dependent upon a type of subscriber terminal. For example, user interfaces and feature sets for the suite of subscriber terminal types to which the subscriber has subscribed (e.g., the general look and feel of how the subscriber terminal takes in, displays and reacts to the subscriber's inputs and operation, channel tuning/program guide on a TV set-top box, URL or e-mail preferences on an Internet terminal or computer, features on a cell phone or wired phone, picture resolution or audio quality on a video phone).

The subscriber profile can also be used by the network service provider for billing purposes to generate separate or integrated itemized bills for the complete suite of services according to service and terminal type, usage, and entitlements. The subscriber or service provider can access certain information fields of the particular subscriber profile to update or revise. The subscriber profile can be automatically updated.

Information contained in or pointed to in the subscriber profile can also include billing account, credit card number and transaction history, or an e-wallet account and associated transaction history to facilitate personalized e-commerce transactions, including automatic bill payment on the subscriber's own network services account.

Once such a subscriber profile has been stored, it may be used to customize the terminals, the connection between the terminals and the network, the type of network to which the terminal is connected, and/or the services the subscriber desires. The customization can occur, at any subscriber terminal location where the subscriber may travel and access the network, regardless of whether such access is wired or wireless, using any subscriber terminal type for which the subscriber is entitled.

Storage of the subscriber profile information may reside in a single point or be distributed throughout multiple points in the network, within the subscriber terminal, or within a device in the subscriber's personal possession (e.g., a smart card), or a combination of these.

As an example of operation, assume that a subscriber's home has one or more terminals (can be same or different terminal types) connected to the network. Each of the terminals has been customized by the subscriber, and the subscriber's preferences, entitlements, e-wallet transactions, payments and billing information have been stored in the subscriber's profile or storage locations pointed to by the profile information. Subsequently, the subscriber travels across the country where the subscriber rents a hotel room. The hotel room also has one or more terminals, which correspond to the types of terminals in the subscriber's house, connected to the network. Once the subscriber is in the hotel room, the subscriber may quickly and conveniently configure each of the one or more terminals the same as the corresponding home terminals in accordance with the subscriber's stored profile. This configuration is initiated by entering the subscriber's ID information into a terminal or ID reader device associated with the terminal. The subscriber ID information can be entered by the subscriber typing a password, inserting or swiping a smart card or magnetic strip card, or by scanning a fingerprint or eye retina, voice pattern recognition, or by the use of some other personal identification recognition reader device coupled to or integrated within the subscriber terminal.

The present invention may further provide a plurality of preferred or entitled subscriber terminal user interfaces or functionality attributes within the subscriber profile that can be transferred to said subscriber's terminal for use, based on the type of transaction or session invoked by the subscriber. For example, if the subscriber is using a terminal connected with a telephone network, such as an automatic teller machine (ATM), then, based on this bank-type of transaction and the subscriber's ID information, the subscriber's ATM interface would be displayed for the subscriber to use while making the transaction. The subscriber would then operate and interact with the ATM through the subscriber's personalized interface. A subsequent subscriber using the same ATM terminal can later interact with the ATM through a different personalized ATM interface or a default interface of the ATM terminal.

As another example, if the subscriber is using a terminal, such as a TV audio/video decoder set-top box, connected with a video delivery network at a friend's house, based on this entertainment, home shopping or e-commerce type of subscriber session a personalized interface can be provided. In this example, based on the subscriber's ID information, and the subscriber's profile, the subscriber's customized programming guide, programming entitlements or home shopping purchase rights e-wallet interface could be displayed and activated by the subscriber. As a result, the subscriber could watch his or her favorite TV programs or special events or make home shopping purchases on their own account while using a friend's terminal.

As yet another example, if the subscriber is using a terminal, such as a computer or Internet terminal, connected with a high speed data network at an airport, then, based on this browsing or remote access type of session, the subscriber's ID information and the subscriber's profile, the subscriber can access a restricted intranet or virtual private network and receive restricted content. In all of the above examples, the appropriate usage billing rates, if applicable, could automatically be charged to the subscriber's account which is linked to the subscriber's stored profile.

As a further example, if the subscriber is using a terminal, such as a computer, connected to, or having access to a variety of networks, such as cable TV, telecommunications, DSL, and/or Internet networks, the terminal may select and use a particular network based on the subscriber's preferences. If the subscriber wishes to use the terminal for watching a television show, then the terminal can be connected to the cable television network to provide the subscriber with video programming. Alternatively, if the subscriber wishes to use the terminal for accessing the Internet, then the terminal may be connected to an Internet network such as the World Wide Web, or to a DSL which is directly connected to an Internet service provider (ISP). Accordingly, the terminal may connect with a preferred network based on the particular use of the terminal and a subscriber's network preferences.

The present invention further provides a method for personalizing ports of a network, which may then be used by the subscriber or the subscriber's terminal to connect with the network. Ports can include any point at which a communication signal may be transmitted into or out of the network. Some examples of ports can include telephone RJ-11 jacks, coaxial cable "F" connector jacks, RJ-45 ethernet connections, fiber optic connections, radio frequency air interfaces and infrared links as used in the types previously described with reference to the high speed access links.

BRIEF DESCRIPTION OF THE DRAWINGS

The invention is described in detail with regard to the following figures, in which like elements are referred to with like numerals, and in which:

FIG. 3 is an exemplary data structure for storing subscriber profile information.

DETAILED DESCRIPTION OF PREFERRED EMBODIMENTS

Figure 1:
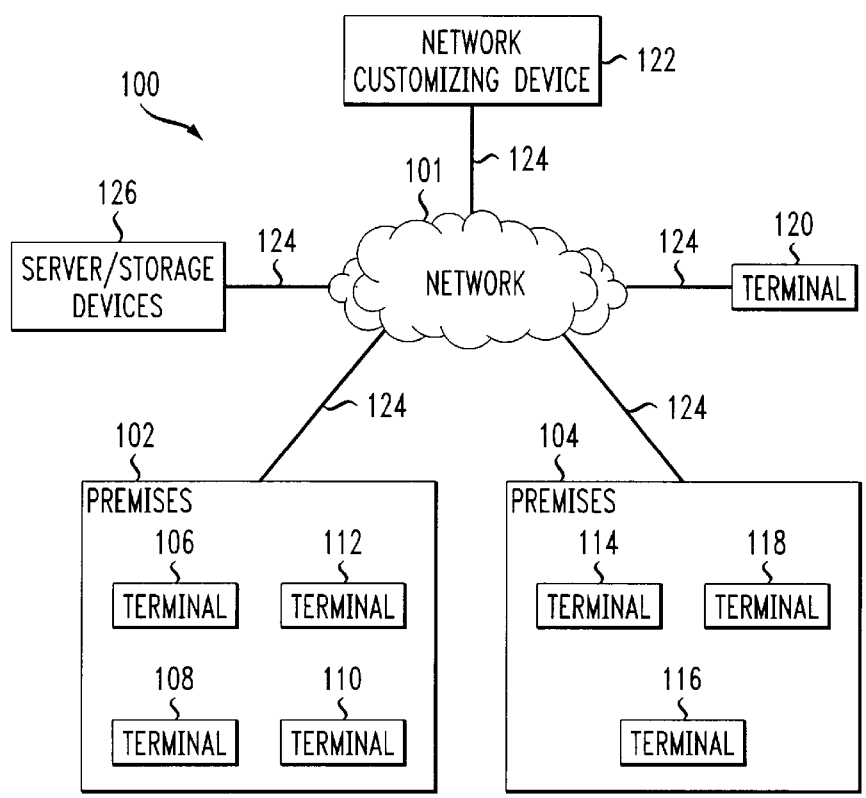
FIG. 1 is an exemplary block diagram of a customizing network system according to the present invention.

FIG. 1 is an exemplary block diagram of a communication system 100 according to the present invention. As shown in FIG. 1, the communication system 100 includes a first premise 102, a second premise 104, server/storage device 126, a network customizing device 122, and a terminal 120 connected with a network 101 via communication links 124. The first premise 102 includes terminals 106, 108, 110 and 112. The second premise 104 includes terminals 114, 116 and 118.

The terminal 120 may be attached to a stationary or moving vehicle or in the possession of a stationary or moving person. The respective terminals 106–118 of the premises 102 and 104 can be connected to the network 101 or communication link 124 by any number of transport or networking methods and physical mediums using baseband or digitally modulated signals, including, but not limited to, multiple twisted pair cable, DSL, coaxial cable, optical fiber, RF cable modems, over-the-air radio frequency, over-the-air optical wavelength (e.g., infrared), local area networks, wide area networks, intranets, virtual private networks, terrestrial broadcast radio or television, satellite transmission, or the like, or combinations of these.

The terminals 106–120 can be devices of any type that allow for the transmission and/or reception of communications signals, and allow a subscriber to connect to and use a network's capacity, features and services, and access or copying rights information, multimedia or program content available through the network. For example, the terminals 106–120 may include, but are not limited to, Internet over TV set-top boxes, digital set-top audio/video decoders, personal digital video recorders, screen equipped web phones, voice and video telephone sets, streaming audio and video media players, integrated intelligent digital television receivers, DBS receivers, personal computers, work stations, thin-client network computers, radios, personal digital assistants, PCS/cellular wireless voice and Internet phones, mobile satellite receivers, GPS receivers, or automated teller machines, or combinations of these.

The premises 102 and 104, terminal 120, the network customizing device 122, and the server/storage devices 126 are in communication with network 101 through communication links 124. These communication links 124 can be any type of wired or wireless circuit-oriented, packet-oriented, cell-based connection-oriented or connectionless link, including, but not limited to, multiple twisted pair cable, DSL, coaxial cable, optical fiber, RF cable modems, over-the-air radio frequency, over-the-air optical wavelength (e.g., infrared), local area networks, wide area networks, intranets, virtual private networks, cable TV, terrestrial broadcast radio or television, LMDS, MMDS, satellite transmission, simple direct serial/parallel wired connections, or the like, or combinations of these.

Communications signals from an originating terminal of types 106–120 or a server/storage device 126 are received by the network 101 via communication links 124 and are inserted, multiplexed, routed and/or switched in network 101 by way of equipment (not shown) including, but not limited to, for example, routers, switches, gateways, multiplexers, transcoders (whether electrical or photonic), for delivery to a destination terminal of types 106–120 for receiving the communication signals. In doing so, the present invention contemplates communications between terminals 106–120 and between server/storage devices 126 and terminals 106–120. Said communications signals may contain voice, images, video, audio or data. Any combination of transmission, routing, switching, multiplexing, transcoding, or gateway equipment related to telecommunications, video/audio distribution and data networks may be used without departing from the spirit and scope of the present invention.

Network 101 may be a single network or a plurality of networks of the same or different types. For example, the network 101 may include a local telephone network in connection with a long distance telephone network. Further, the network 101 may be a data network or a telecommunications or video distribution (e.g., cable, terrestrial broadcast, or satellite) network in connection with a data network. Any combination of telecommunications, video/audio distribution and data networks, whether a global, national, regional, wide-area, local area, or in-home network, may be used without departing from the spirit and scope of the present invention. For the purposes of discussion, it will be assumed that the network 101 is a single integrated voice, video and .data network, that is either wired and/or wireless.

The server/storage device 126 may be an independent unit coupled to the network 101, or it may be distributed throughout the network 101. The preferred embodiment of the present invention contemplates a plurality of such server/storage devices 126 coupled to the network at multiple points. For example, server/storage devices 126 may be resident in the various telephone central office, cable system head-end or distribution hub, satellite up-link, broadcast studio, server complex, or data center premises which are distributed throughout the network 101. Examples of said server/storage device 126 include, but are not limited to, video server for stored movies on-demand content, streaming multimedia file server for stored synchronized audio/video or image file content, html web page stored content server, broadcast studio equipment for live program content origination. Any on-demand, client-server, or broadcast server/storage device 126 configuration that does any or all of the following: originates, stores, broadcasts (one server to all terminals), multicasts (one server to many terminals) or unicasts point-to-point (one server to one terminal) information, multimedia or video/audio program content to terminal types 106–120 may be used without departing from the spirit and scope of the present invention.

The network customizing device 122 may also be an independent unit coupled to the network 101, or it may be distributed throughout the network 101, manifested as a constituent part of a server/storage device 126, back office system 214 (FIG. 2), or other computing, switching, routing, gateway, transcoding, multiplexing or transmission device, system or equipment. For example, the network customizing device 122 may be resident in said system or equipment located in the various telephone central office, cable system head-end or distribution hub, satellite up-link, broadcast studio, server complex, or data center premises which are distributed throughout and coupled to the network 101. Any network customizing device 122 configuration that permits the establishing of any or all of the following: customized use of and access to the functions and features of network 101, customization of the attributes of connection links 124 between the plurality of terminals 106–120 and the network 101, customization of access or copying rights to the content and information available from the server/storage devices 126, or customization of the user interface or functionality attributes of the terminals 106–120 may be used without departing from the spirit and scope of the present invention.

The network customizing device 122 can provide a terminal 106–120 with customized access, use and connection with the network 101 and with server/storage devices 126. When a subscriber uses a terminal 106–120 to establish a connection with the network 101, the terminal 106–120 can transmit an initial request to establish a connection with the network 101. Alternatively, the terminal 106–120 may be in constant connection with the network 101 and the initial request can be simply to initiate communication with the network 101. The initial request can include the transmission of subscriber ID information which uniquely identifies the subscriber using the terminal 106–120. The subscriber ID information may be entered through any number of techniques, such as entering a pass code/password, swiping a smart card or magnetic strip card through a reader, scanning a fingerprint or eye retina, voice recognition, or by the use of some other personal identification recognition reader device coupled to or integrated within the subscriber terminal. Based on the subscriber ID information, the network customizing device 122 can access a subscriber profile that is stored in the memory/mass storage of the network customizing device 122.

Figure 4:
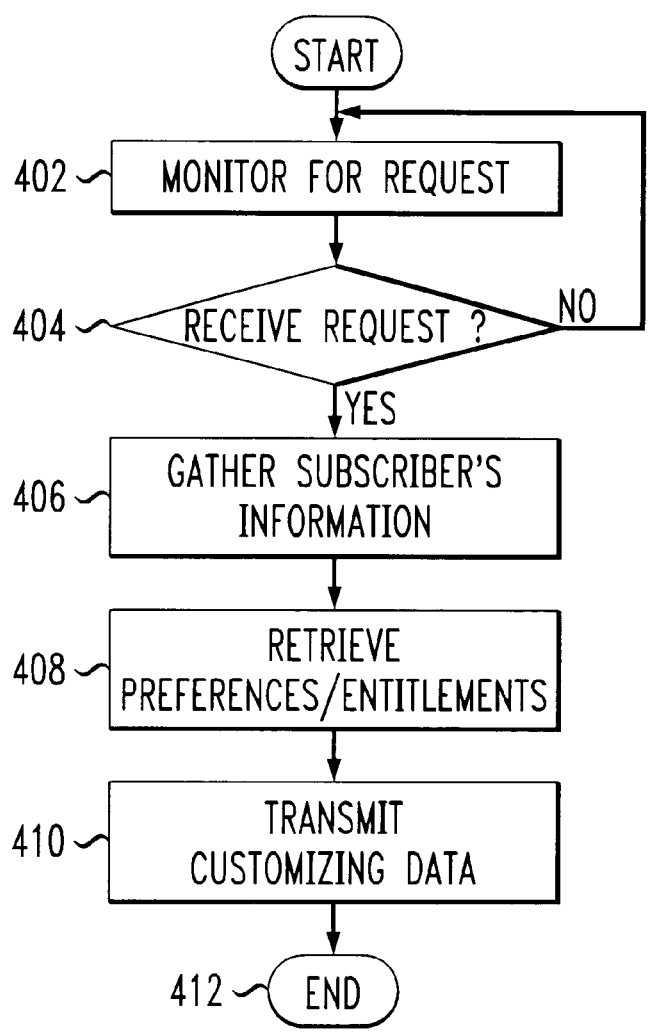
FIG. 4 is a flowchart outlining an exemplary process of providing customized connections to a communication network according to the present invention.

Like the network customizing device 122 which contains it, the subscriber profile information can be contained in a single database location coupled to the network 101 or it may be distributed in multiple locations throughout the network 101, such as the "back office" systems 214 of FIG. 4. Additionally, portions of subscriber profile information can be contained in the subscriber terminal itself, as well as contained in devices held in the personal possession of the subscriber (e.g., a smart card). Furthermore, the subscriber profile may directly include the types of information described below or it may contain locator information pointing to at least one storage location on the network 101 where said types of information can be found by the network customizing device 122.

The types of information contained in the subscriber profile can include the content preferences and purchased service entitlements available through the network 101 using the terminal 106–120. For example, if the terminal 106–120 is an intelligent interactive television receiver with Internet/intranet browsing capability, the relevant subscriber profile information may contain a listing of television or radio programming content that the subscriber prefers or has purchased a subscription to, as well as the permissible URL (Universal Resource Locator) Internet/intranet addresses to which the subscriber is entitled or prefers.

Some examples of the television or radio content include, but are not limited to, premium encrypted or basic unencrypted MPEG digital video programming genres (e.g., westerns, news, sports, business, romance), time-shifted services (watching favorite sitcom at a time different than original air time), radio program formats (e.g., jazz, classical, rock). Examples of Internet/intranet content, related or unrelated to the programming content, include still images, multimedia streaming audio and video (MPEG, IP, etc. . . . ), software downloads through the network 101 to the terminal 106–120, html web pages, or the like, as may be stored and delivered from server/storage devices 126 connected to network 101.

Accordingly, when the subscriber is identified using a terminal 106–120 for watching interactive television, the network customizing device 122 accesses the subscriber's profile, intercommunicates with the appropriate subscriber management, conditional access, billing/e-wallet or credit card authorization, and/or network management devices on the network to subsequently provide the subscriber's current terminal with the appropriately entitled premium or basic television programming, as well as access to the entitled multimedia Internet/intranet content. Additionally, the e-wallet or credit card account portion of the subscriber's profile is activated if the subscriber uses the terminal 106–120 to shop at home using the interactive television terminal, for example.

As another example of preferences or service entitlement subscriber profile information types, if the terminal 106–120 in use is a voice or video telephone (either wired or wireless), the subscriber profile may contain information on the long distance, local or wireless calling plans (e.g., per-minute rates, peak/off hours, calling circles, and the like), video resolution, audio quality, user interface "look and feel" attributes.

As yet another example of preferences or service entitlement subscriber profile information types, if the terminal 106–120 in use is a personal computer or work station, the subscriber profile may contain information on the subscriber's preferences defining the applications software genres that said subscriber is entitled to download through the network 101 (e.g., financial software, statistics software, database software). In this example, the downloads may be provided by an ASP (Applications Service Provider), which may or may not also be the network 101 operator.

The types of information contained in the subscriber profile also include, but are not limited to, the communications link 124 attributes and/or the terminal 106–120 attributes to which the subscriber prefers or has purchased entitlement. Examples of this type of subscriber profile information can include transmission speed, guaranteed information rate, quality of service guarantees, delay variation guarantees, audio/video/data communications protocols, multiple access fairness/priority parameters of the communications link 124, as well as, but not limited to, such terminal 106–120 attributes as look and feel of the graphical user interface, display modes, display resolution, feature (e.g., "bells and whistles", audio quality, and the like) activation.

As described above, the subscriber profile may also contain information concerning the subscriber's preferred networks that correspond to particular uses of the terminals 106–120. For example, if the subscriber wishes to use a terminal 106–120 for telecommunications, then the terminal can be automatically connected with the subscriber's preferred telecommunications network. If a subscriber wishes to use a terminal 106–120 to view a particular Internet site, then the terminal 106–120 can be automatically connected with the subscriber's preferred Internet network.

As an example, if the terminal 106–120 is a digital set-top audio/video decoder, the relevant subscriber profile information may contain the digital video resolution, depth, display, scan and frame format (e.g., standard definition, high definition, 3D or 2D, and the like). As another example, when a subscriber attempts to establish a communication with the network 101 using the terminal 106–120, which is a packet voice or video telephone terminal, the network will know at which audio and video protocols to establish the communication. Examples of such protocols include G.711, G.721, G.723, G.729, G.729A, H.261, H.263, H.263, MGCP, text/graphics protocols, browsers, facsimile, T.120, or the like.

As an example of subscriber profile information describing user interface preferences, the network customizing device 122 can provide a terminal 106–120 with a specific personalized interface when a subscriber uses any of the terminals 106–120 connected with the network 101. The interfaces can be considered portable since the same interface can be displayed on any terminal 106–120 which a subscriber is currently using. The interface may be customized to reflect a subscriber's personal preferences. The customized interface may be that created by the subscriber, or may be those which the subscriber previously downloaded from a commercial interface designing service or by the network or service provider for the subscriber.

Furthermore, the customized interface can be a portion of an existing user interface which the subscriber found particularly helpful, and therefore the subscriber extracted the useful portion and combined it with the subscriber's existing interface.

The network customizing device 122 can store the various user interfaces for each of the subscribers as part of the subscriber's profile. Each subscriber can have numerous user interfaces stored in the subscriber's profile. Each of the subscriber's interfaces can also correspond to a specific type of transaction or session on a terminal 106–120. For example, assume that terminal 120 is a public video phone and that the subscriber wishes to place a video call to the terminal 108 which is a private video phone for this example. When the subscriber activates the video phone terminal 120 and enters subscriber ID information, the terminal 120 can prompt the subscriber to determine whether the subscriber wishes to use a personal user interface or the terminal 120's default video telephone interface. In response, the subscriber can enter a selection by any method, such as by keypad, touch screen, voice command, or the like. Alternatively, the subscriber's ID information and the user interface selection can be entered by sweeping a Smart Card through the terminal 120 which contains a record of the subscriber's information, such as user interface preferences or entitlements.

If the subscriber chooses the terminal's 120 default interface, then the subscriber is provided with the default interface and the video call is placed accordingly. If the subscriber chooses a personal video interface, then the terminal 120 can notify the network customizing device 122 via the network 101 of the request. The request can contain information concerning the subscriber's identification along with the type of transaction the subscriber currently wishes to conduct on the terminal 120 (i.e., a video telephone call). Based on the request, the network customizing device 122 can query the portion of the subscriber profile which includes the subscriber's video phone interface.

In response to the query from the network customizing device 122, the subscriber's requested interface can be located in the subscriber profile and returned to the network customizing device 122. The network customizing device 122 then transmits the requested interface to the terminal 120 via network 101. The terminal 120 subsequently displays the video phone interface to the subscriber so that the subscriber may then use the interface to operate the video phone.

Furthermore, in this example, the video phone interface can include information that the subscriber finds useful in placing a call on a video phone. Such information can include a directory of telephone numbers of the subscriber's friends, family, business associates and/or a subscriber's preferred telephone directory, such as the AT&T telephone directory, a clock function which displays the length of the call and possibly the corresponding cost of the call, the subscriber's calling card number to be charged and the like. Furthermore, user preferences, such as resolution and update rate of the video pictures, can be automatically established by the personal user interface. Additionally, the subscriber's video phone interface can give access to the subscriber's messages (video and/or voice) which have been left by missed callers.

By providing a common interface or a set of common interfaces, the subscriber is always presented with a familiar or preferred interface regardless of the type of terminal 106–120 that the subscriber chooses to use. Accordingly, the subscriber is not confronted with a new and sometimes confusing interface each time a different terminal 106–120 is used. The familiar interface reduces the time that it takes to familiarize oneself with a new terminal 106–120. Therefore, the subscriber can switch between terminals 106–120 without the need to know or learn a new interface.

Any type of subscriber profile information containing any or all of the following may be used without departing from the spirit and scope of the present invention: (1) subscriber's personal identification verification information including passwords, fingerprint recognition, voice print recognition, retina scan print, other biometric information or the like; (2) terminal types used by a particular subscriber; (3) transaction or session types associated with particular terminal types; (4) subscriber's e-wallet, billing or credit card transaction, purchase and payment information; (5) subscriber's preferences and entitlements regarding terminal 106–120 functionality and user interface attributes; (6) subscriber's preferences and entitlements regarding communication links 124 performance and service attributes; (7) subscriber's preferences and entitlements regarding network 101 performance, service, access and usage attributes; (8) subscriber's preferences and entitlements regarding access and copying rights to content or information contained on server/storage devices 126; (9) a preferred network that the subscriber prefers to be connected with while using a terminal; and/or (10) locator information pointing to at least one storage location distributed on the network 101 where the aforementioned types of information can be found.

Figure 2:
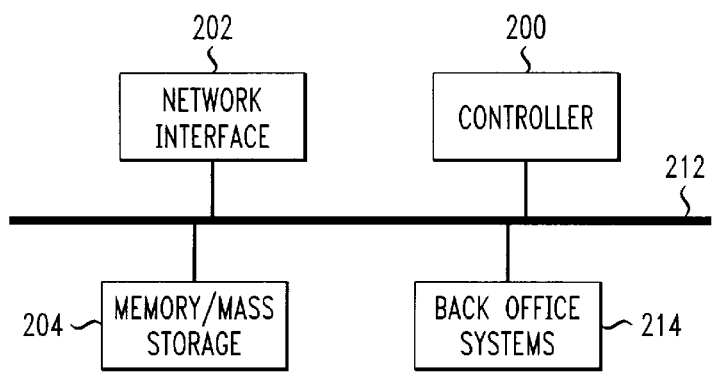
FIG. 2 is an exemplary block diagram of the network customizing device of FIG. 1.

FIG. 2 is an exemplary block diagram of a network customizing device 122. The network customizing device 122 includes a controller 200, at least one network interface 202, memory/mass storage 204 and back office 214. The above components are coupled together through control/signal, address and data buses 212. The network interfaces 202 may be a single interface type or a plurality of interface types, each of which communicates using one or more protocols and signal types appropriate for performing communications with the network 101, communication links 124, server/storage devices 126, terminals 106–120, and "back office" systems 214 including, but not limited to, billing, conditional access, provisioning, network management, content management systems.

In operation, the controller 200 communicates with the network 101 via the network interface 202 in order to configure and control network 101 and to communicate with the communication links 124 and the terminals 106–120 in order to configure and control said communication links 124 and terminals 106–120 respectively. Additionally, the controller 200 communicates, via the network interface 202, configuration and access information to the server/storage devices 126.

Furthermore, in retrieving the subscriber information, or in performing the configuration and control functions, the controller 200, via the network interface 202 or the control/signal, address and data buses 212, may communicate with such "back office" system(s) 214 including, but not limited to, billing, conditional access, provisioning, network management, content management systems. The back office systems 214 may be independent or manifested as a constituent part of server/storage devices 126 or the network customizing device 122.

A subscriber can be registered with the controller 200 by the subscriber or by the network operator or service provider and thereby create a subscriber profile which the controller 200 can store in the memory/mass storage 204, along with corresponding subscriber ID information. Subsequently, in response to the subscriber using the terminal 106–120, the controller 200 can query the memory/mass storage 204 to determine the corresponding preferences and entitlements of the subscriber, configure the network 101 appropriately and direct said network 101 to supply and control the communication links 124 and the terminal 106–120 with the appropriate attribute configuration information.

Furthermore, the controller 200 is capable of configuring numerous terminals within a subscriber's environment based on the subscriber's profile in memory/digital storage 204. For example, assume that a subscriber had stored preferences and entitlements for three types of terminals: an integrated intelligent television, a telephone, and a radio in the memory/mass storage 204 as part of the subscriber's profile. These terminals correspond to the types of terminals which are in the subscriber's house. Furthermore, assume that the subscriber was house-sitting for a friend who lived in the premise 102. The premise 102 contains four terminal types 106–112. Terminal 106 is a television, terminal 108 is a radio, terminal 110 is a telephone, and terminal 112 is a video phone.

As the subscriber enters the friend's home, premise 102, the subscriber presses an index finger against a fingerprint reader located in the premise 102. In response, the reader sends corresponding subscriber ID information to the controller 200 via the network 101. The controller 200 can then search the subscriber's profile in memory/mass storage 204 in order to determine the subscriber's preferences and services entitlements. The controller 200 can then, through the network interface 202, communicate with the network 101, the communications links 124, server/storage devices 126, back office systems 214, and the terminals 106–112 located at the premise 102 to configure said network 101, said communication links 124, said server/storage devices 126 and said terminals 106–112 in accordance with the attributes, preferences and entitlements defined in the subscriber's profile information.

For example, since the subscriber's preferences and entitlements with regard to a television terminal type and associated television services had already been stored in the subscriber's profile, the terminal 106, which is a television, as well as the program services which the subscriber prefers or is entitled to can be configured and authorized respectively, in accordance with the subscriber's profile. The subscriber's service preferences and entitlements may include a listing of favorite channels which the subscriber likes to view, along with access and any copying rights to certain premium program channels to which the subscriber subscribes. The subscriber's terminal 106 configuration preferences and entitlements may include the activation of special digital decoding formats, operating attributes look and feel (e.g., program guide or channel navigation user interface) or enhanced features (e.g., high definition or 3D video, surround sound audio, enhanced closed captioning) to which the subscriber prefers or subscribes.

In a similar manner, since the subscriber already has preferences and entitlements stored in the subscriber's profile for a radio and telephone, the terminal 108 and terminal 110 can be configured in accordance with those preferences and entitlements. Such preferences and entitlements may include music genres (e.g., classical, country-western, etc. . . .) in the case of the radio terminal 108 and calling features (e.g., call forwarding, call waiting, calling circle of frequently called numbers, etc. . . . ) in the case of the telephone terminal 110. If terminal 110 was a cable modem or DSL modem instead, such preferences and entitlements may include the guaranteed bit rate or quality of service attributes of both the terminal 110 and the communications link 124.

The terminal 112, which is a video phone, does not have a corresponding set of preferences stored in the subscriber's profile. Accordingly, at this point the controller 200 can leave any existing or default attributes intact with respect to terminal 112 and the communications link 124 which serves it. The existing default attributes may then be altered by the subscriber and the subscriber or the service operator may store the new set of preferences and entitlements in the subscriber's profile. Thereafter, the subscriber would have a profile of preferences and entitlements corresponding to a video phone terminal. The preferences and entitlements may include such attributes as the protocol type, resolution, bit rate and quality of the video and audio formats, frequently called numbers, and the like.

Alternatively, the controller 200 may provide a "best fit" list of attributes for the video phone, terminal 112. In such case, the controller 200 may combine the subscriber's preferences with regard to the television and telephone terminal types to construct the best fit list of attributes for a video phone terminal type. Such best fit attributes may then be applied to terminal 112, the video phone. The best fit attributes may also be altered by the subscriber or network operator/service provider and stored in the subscriber's profile so that the subscriber would then have his/her own preferences and entitlements corresponding to a video phone in said profile.

In the manner described above, the subscriber is able to customize the user interface and functionality attributes of numerous terminal types 106–120, as well as that of the communications links 124 and the network 101. Additionally, the subscriber is able to customize the preferences and entitlements with respect to the content to be accessed, delivered or copied from the content server and storage device 126 through terminals 106–120, wherever the subscriber may travel.

By storing a list of subscriber preferences and entitlements in the memory/mass storage device 204, the controller 200 may subsequently customize the terminal types and services for any premise 102, 104 which a subscriber may visit. In this manner, a subscriber won't be required to continually re-enter the subscriber's personal preferences and entitlements when operating a terminal connected with the network 101 that the subscriber has already entered such preferences and entitlements.

FIG. 3 discloses an exemplary data structure 300 for storing subscriber profile information in the subscriber database. Field 302 contains a subscriber ID. The subscriber ID can be any unique identifier of a particular subscriber. The subscriber ID can be a numerical or alphanumerical identification number which uniquely identifies a subscriber. Furthermore, the subscriber ID in field 302 can be a voice print record of the subscriber, whereby a voice sample of the subscriber can be identified by various speech recognition techniques in order to a identify a subscriber. Furthermore, the subscriber ID may include any biometric information, such as fingerprint or retina scan data.

Field 304 contains the types of terminals for which the corresponding subscriber field 302 has stored a preference or entitlement. Field 304 may also contain the types of transactions or sessions associated with the terminal types. For example, subscriber 1 has stored preferences or entitlements for televisions, telephones, and radio terminal types. However, the type of terminal types stored in this field 304 includes, but is not limited to, these aforementioned types, as well as, Internet over TV set-top boxes, digital set-top audio/video decoders, personal digital video recorders, screen equipped web phones, voice and video telephone sets, streaming audio and video media players, integrated intelligent digital television receivers, DBS receivers, personal computers, work stations, thin-client network computers, radios, personal digital assistants, PCS/cellular wireless voice and Internet phones, mobile satellite receivers, GPS receivers, or automated teller machines.

Field 306 contains the billing, credit card or e-wallet information corresponding to each of the terminal types in Field 304 and the subscriber preferences or entitlements in Field 308. As shown for subscriber 1, the bills for the use of television terminal types and associated service preferences or entitlements in Field 308 are sent to mailing address 1 while the bills for telephone terminal types and associated preferences or entitlements in Field 308 are sent to mailing address 2. Furthermore, as shown in Field 306, the bills for the use of the radio terminal type and associated preferences or entitlements in Field 308 of subscriber 1 are charged directly to credit card 1. As shown in Field 306 with regard to subscriber 2, all of the bills for all of the terminal types and the associated preferences or entitlements can be charged to a single address, or to a single credit card, e-wallet or bank account. Furthermore, the terminal types may be billed to different individuals depending on the wishes of the subscriber.

Field 308 contains a subscriber's preferences and/or entitlements, including conditional access or copying rights, applicable to the terminal types in Field 304. As shown in Field 308, subscriber 1 has television, telephone, and radio preferences or entitlements corresponding to the television, telephone, and radio terminal types in Field 304. If the terminal type is a television, the preferences or entitlements can include any or all information pertaining to the viewing of video programming events. For example, the television preferences or entitlements may include, but are not limited to, a listing of all the program events that the subscriber prefers or is entitled to by virtue of the subscriber's subscription (e.g., by genre, channel, specific event such as pay-per-view, etc.).

As another example, if channels 1 to 200 and a full suite of programming events and genres are provided by a service provider, and the subscriber only prefers or subscribes to channels 1 to 50 or sports and westerns along with premium channels 60 to 64, then this information could be included in the television preferences. Additionally, the preferences may include blocking information, by which blocked program events of channels containing excessive violence, strong language, and/or adult content can be blocked from viewing by the subscriber. Furthermore, if the television terminal includes a browser for access to the world-wide-web, an intranet or other virtual private network, the preferences or entitlements may be a list of authorized URLs for content access to particular content server/storage devices 126 which may be connected through communications link 124 to the network 101.

The information contained in the telephone terminal type preferences in Field 308 includes, but is not limited to, subscribed custom calling features, frequently called numbers and calling circles, rate information.

The information contained in the radio terminal type preferences in Field 308 includes, but is not limited to, preferred or subscribed musical formats (e.g., jazz, classical, pop, western), the type of commercial advertising spots that are heard or muted, daily listening schedules as to favorite talk shows or DJs, favorite artist alerts, etc.

Field 308 may also contain locator information pointing to at least one or more locations where subscriber profile information can be found contained in distributed storage locations throughout the network.

Field 310 contains user interface and functionality attributes which the subscriber can be provided with when using a particular terminal for a particular purpose. For example, if a subscriber were using an automatic teller machine (ATM) type terminal, the network customizing device would provide the subscriber with the corresponding ATM interface defined by the information stored in Field 310. Thereby, the subscriber can use a familiar ATM interface with the terminal in order to interact with the terminal. As another example, if the subscriber were using a television type terminal, the network customizing device would provide the subscriber with the corresponding program event guide, browser, or other user interface screen types, as well as configure the terminal for any special key functionality as defined by the information stored in Field 310. Thereby, the subscriber can use a preferred program guide or browser user interface screen, coupled with any special function keys, providing the subscriber with the terminal "look and feel" that the subscriber prefers or has subscribed to.

Field 312 contains the service description and quality of service attributes pertaining to terminals 106–120, network 101, communications links 124, and content server/storage devices 126 which the subscriber prefers or is entitled (by virtue of the subscriber's subscription or service arrangements) to use while communicating with the network and/or other terminals. As shown in Field 312, subscriber 1 has selected high quality video, medium quality audio and medium quality data transmission qualities. The high, medium and low quality ratings can represent such parameters as communication protocols, guaranteed information transfer rates, access queue priority or fairness rules, or combinations of communications protocols which can be interpreted by the controller 200 of the network customizing device 122 in order to provide the subscriber's communications with a selected level of quality. For example, a video communication rated as high quality can be transmitted using the H.323 protocol while a video communication rated as medium quality can be transmitted using a H.263 communication protocol. The subscriber may select the varying qualities of service in order to meet the subscriber's particular communication and/or cost needs. Field 312 can contain the quality of service attribute information needed to enable the network customizing device 122 to configure the appropriated elements of network 101, communication links 124, terminals 106–120, and content server/storage devices 126 to establish the selected customized connection.

Any number or combination of fields containing the types of subscriber profile information specified herein may be used without departing from the spirit and scope of the present invention.

FIG. 4 shows a flowchart of an exemplary process of the present invention. In step 402 the process monitors a network 101 for a request from a terminal 106–120 to customize the terminal or set of terminals 106–120.The request can be the result of a subscriber activating the terminal 106–120 to begin a "transaction" or session, such as a banking transaction if the terminal is an ATM, a television watching/Internet browsing session, if the terminal is a television set, or a video telephone call to a friend. Furthermore, the request can be the result of a user initiating a personal identification "log-on" activity, such as entering a password, swiping a magnetic strip card, inserting a smart card, pressing a keypad, using a cellular phone, or the like, depending on the terminal 106–120 type.

The process then proceeds to step 404 where the process checks to see if a request has been received. If a request has been received, the process proceeds to step 406; otherwise, the process returns to step 402 and continues to monitor the network.

In step 406 the process gathers the subscriber ID information of a subscriber requesting the customization of a terminal or set of terminals 106–120. Additionally, the process may recognize the terminal type and the type of transaction or session in which the subscriber is participating. The process then proceeds to step 408.

In step 408, the process retrieves the subscriber's terminal types, transaction or session types, billing /e-wallet account information, preferences and/or entitlements, location pointer information (if applicable), terminal user interfaces and functionality attributes, and service description and quality of service attributes from a database which corresponds to the subscriber's ID information. The process then proceeds to step 410.

In step 410, the process communicates (i.e., performs the necessary send and receive dialog) the information retrieved in step 408 to the network 101, the communication links 124, the back office systems 214, the server/storage devices 126, and the terminal or set of terminals 106–120 which the subscriber has requested to be personalized, as necessary to establish the customized type and quality of service, network connection, user interface, terminal functionality attributes, or content access and copying rights, commensurate with the subscriber's profile. Once the information has been communicated, the process proceeds to step 412 where the process is terminated.

As shown in FIG. 2, the method of this invention is preferably implemented on a programmed processor. However, the network customizing device 122 can also be implemented as part of a server/storage device 126, back office system 214, or other computing, switching, routing, gateway, transcoding, multiplexing or transmission device, system or equipment, or a stand alone general purpose or special purpose computer, a programmed microprocessor or microcontroller and peripheral integrated circuit elements, an Application Specific Integrated Circuit (ASIC), or other integrated circuit, a hardware electronic or logic circuit such as a discrete element circuit, a programmable logic device such as a PLD, PLA, FPGA, or PAL, or the like. In general, any device on which exists a finite state machine capable of implementing the flowcharts shown in FIG. 4 and the functionality shown in FIG. 2 can be used to implement the network customizing device 122 functions of this invention.

While this invention has been described in conjunction with the specific embodiments thereof, it is evident that many alternatives, modifications, and variations will be apparent to those skilled in the art. Accordingly, preferred embodiments of the invention as set forth herein are intended to be illustrative, not limiting. There are changes that may be made without departing from the spirit and scope of the present invention.

What is claimed is:

1. A method for customizing a connection to a network for at least one terminal, comprising:
   receiving a request to customize the connection to at least one terminal;
   retrieving a customized subscriber profile based on the request wherein the customized subscriber profile includes at least one terminal type and at least one subscriber preference or entitlement which corresponds to each of the terminal types of a subscriber, at least one previously stored terminal user interface or functionality attribute, and at least one previously stored service description or service quality attribute; and
   customizing the connection with the at least one terminal based on the retrieved subscriber profile, including the subscriber profile includes at least one terminal type and at least one subscriber preference or entitlement which corresponds to each of the terminal types of a subscriber, at least one previously stored terminal user interface or functionality attribute, and at least one previously stored service description or service quality attribute.

2. The method of claim 1, wherein the customization of the connection with the at least one terminal further includes transmitting a customization message to the at least one terminal, the customization message having instructions to modify the operation of the at least one terminal which are based on the subscriber profile.

3. The method according to claim 1, wherein the customization of the connection with the at least one terminal further includes modifying a transmission of data to the at least one terminal from the network based on the subscriber profile.

4. The method according to claim 1, wherein the customization of the connection with the at least one terminal further includes transmitting a customization message to a network with which the at least one terminal is connected, the customization message having instructions to modify the operation of the network based on the subscriber profile.

5. The method according to claim 1, wherein the customization of the connection with the at least one terminal further includes transmitting a customization message to at least one communications link, the customization message having instructions to modify the operation of the at least one communications link based on the subscriber profile.

6. The method according to claim 1, wherein the customization of the connection with the at least one terminal further includes transmitting a customization message to at least one server/storage device, the customization message having instructions to modify the operation of the at least one server/storage device based on the subscriber profile.

7. The method according to claim 1, wherein the at least one subscriber preference or entitlement includes previously stored data on how to customize the corresponding terminal types.

8. The method according to claim 1, wherein the at least one subscriber preference or entitlement includes previously stored data on how to custumize the network for connection with the corresponding terminal types.

9. The method according to claim 1, wherein the at least one subscriber preference or entitlement includes previously stored data on how to customize the at least one communications link for connection with the corresponding terminal types.

10. The method according to claim 1, wherein the at least one subscriber preference or entitlement includes previously stored data on how to customize the at least one server/storage device.

11. The method according to claim 1, wherein the request to customize the at least one terminal includes a request for a service description or service quality attribute.

12. The method according to claim 1, wherein the request further includes subscriber identification information, said subscriber identification (ID) being a unique identifier of a subscriber.

13. The method according to claim 1, wherein the subscriber profile further includes billing information for a subscriber.

14. The method according to claim 11, wherein customizing the communication with the at least one terminal further includes: retrieving a service description or service quality attribute from the at least one previously stored service description or service quality attribute, and transmitting the retrieved service description or service quality attribute to one of the at least one terminal, the network, the at least one communications link and the at least one server/storage device.

15. The method according to claim 12, wherein the subscriber ID includes at least one of a numeric or alphanumeric password, voice data and biometric data.

16. The method according to claim 14, wherein retrieving the service description or service quality is based on a type of transaction or session the subscriber is transacting or initiating on the at least one terminal.

17. An apparatus for customizing a connection to a network, for at least one terminal, comprising:
   a memory that stores at least one customized subscriber profile including at least one previously stored user interface and at least one previously stored service description or service quality attribute;
   a network interface; and
   a controller connected with the memory and the network interface that receives a request to customize the connection including a request for a terminal user interface/functionality type and a request for service description or service quality attribute, retrieves a customized subscriber profile from the memory based on the request, and customizes the connection with the at least one terminal based on the subscriber profile.

18. The apparatus according to claim 17, wherein the controller further transmits a customization message to the at least one terminal, the customization message having instructions to modify the operation of the at least one terminal which are based on the subscriber profile.

19. The apparatus according to claim 17, wherein the controller modifies a transmission of data between the at least one terminal and the network based on the subscriber profile.

20. The apparatus according to claim 17, wherein the controller transmits a customization message to a network with which the at least one terminal is connection, the customization message having instructions to modify the operation of the network based on the subscriber profile.

21. The apparatus according to claim 17, wherein the controller transmits a customization message to at least one communications link, the customization message having instructions to modify the operation of the at least-one communications link based on the subscriber profile.

22. The apparatus according to claim 17, wherein the controller transmits a customization message to at least one server/storage device, the customization message having instructions to modify the operation of the at least one server/storage device based on the subscriber profile.

23. The apparatus according to claim 17, wherein the subscriber profile includes at least one terminal type and at least one subscriber preference or entitlement corresponding to each of the terminal types of a subscriber.

24. The apparatus according to claim 17, wherein the controller retrieves a terminal user interface or functionality attribute from the at least one previously stored user interface or functionality attribute, and transmits the retrieved terminal user interface or functionality attribute to one of the at least one terminal the network, at least one communications link and at least one server/storage device.

25. The apparatus according to claim 24, wherein retrieving the service description or service quality attribute is based on a type of transaction or session the subscriber is transacting or initiating on the at least one terminal.

26. The apparatus according to claim 17, wherein the request further includes subscriber identification information, said subscriber ID being a unique identifier of a subscriber.

27. The apparatus according to claim 23, wherein the at least one subscriber preference or entitlement includes previously stored data on how to customize the corresponding terminal type.

28. The apparatus according to claim 23, wherein the subscriber profile further includes billing information for a subscriber.

29. The apparatus according to claim 24, wherein the controller retrieves the terminal user interface or functionality attribute based on a type of transaction or session the subscriber is transacting or initiating on the at least one terminal.

30. The apparatus according to claim 26, wherein the subscriber ID includes at least one of a numeric or alphanumeric password, voice data and biometric data.

31. The apparatus according to claim 28, wherein the billing information corresponds to each of the terminal types.

* * * * *